United States Patent [19]

Romance

[11] Patent Number: 4,897,448

[45] Date of Patent: Jan. 30, 1990

[54] POLYESTER/POLYCARBONATE BLENDS

[75] Inventor: Kenneth A. Romance, Kingsport, Tenn.

[73] Assignee: Eastman Kodak Company, Rochester, N.Y.

[21] Appl. No.: 176,519

[22] Filed: Apr. 1, 1988

[51] Int. Cl.$^4$ .................... C08L 67/02; C08L 69/00
[52] U.S. Cl. ........................ 525/67; 525/146; 525/148
[58] Field of Search ............. 525/67, 146, 148

[56] References Cited

U.S. PATENT DOCUMENTS

| | | | |
|---|---|---|---|
| 2,465,319 | 3/1949 | Whinfield et al. | 260/75 |
| 3,047,539 | 7/1962 | Pengilly | 260/75 |
| 3,153,008 | 10/1964 | Fox | 260/47 |
| 3,864,428 | 2/1975 | Nakamura et al. | 260/873 |
| 4,018,750 | 4/1977 | Onizawa | 260/78 A |
| 4,096,202 | 6/1978 | Faraham et al. | 260/873 |
| 4,123,436 | 10/1978 | Holub et al. | 260/30.8 R |
| 4,200,567 | 4/1980 | Goldman et al. | 260/40 R |
| 4,267,096 | 5/1981 | Bussink et al. | 260/40 R |
| 4,485,212 | 11/1984 | Wefer | 525/64 |
| 4,493,921 | 1/1985 | Wefer | 525/67 |
| 4,536,538 | 8/1985 | Liu | 524/508 |
| 4,550,138 | 10/1985 | Paddock et al. | 525/67 |
| 4,554,312 | 11/1985 | Barabas et al. | 524/808 |
| 4,554,314 | 11/1985 | Chung | 525/67 |
| 4,554,315 | 11/1985 | Chung et al. | 525/67 |
| 4,628,074 | 12/1986 | Boutni | 525/146 |

FOREIGN PATENT DOCUMENTS 0135779 4/1985 European Pat. Off. .

*Primary Examiner*—Patricia Short
*Attorney, Agent, or Firm*—John F. Stevens; William P. Heath, Jr.

[57] ABSTRACT

An impact modified polyester-polycarbonate blend, comprising:

1. 20-45 wt % of a poly(ethylene terephthalate) resin,
2. 20-50 wt % of a poly(cyclohexylene dimethylene terephthalate) resin,
3. 10-50 wt % of a polycarbonate, and
4. 8-20 wt % of an impact modifier, wherein the notched Izod impact strength of said blend is greater than 2.0 ft-lb/in. at −40° C. and greater than 18.5 ft-lb/in. at 23° C.

8 Claims, No Drawings

POLYESTER/POLYCARBONATE BLENDS

FIELD OF THE INVENTION

The present invention relates to blends of poly(ethylene terephthalate), poly(cyclohexylene dimethylene terephthalate), bisphenol-A-polycarbonate and an impact modifier.

DISCUSSION OF THE BACKGROUND

Aromatic polycarbonate polymers are well known and exhibit properties of extreme toughness, transparency, resistance to burning and in general, maintenance of useful properties over a wide temperature range. Although polycarbonates exhibit high impact strength in general, the impact strength decreases at low temperatures and at elevated temperatures after aging of the polymers.

Blends of polycarbonates (PC) with other thermoplastic resins have been sought, therefore, to improve the impact resistance of polycarbonate resins. Typical polymer blends include polycarbonate resins with poly(alkylene terephthalate) resins such as those disclosed in U.S. Pat. No. 4,554,315, U.S. Pat. No. 4,267,096 and EP 0 135 779. Polycarbonate blends with poly(cyclohexylene dimethylene terephthalate) resins (PCT) are also known such as those disclosed in U.S. Pat. No. 4,628,074 and U.S. Pat. No. 4,536,538.

Specifically, U.S. Pat. No. 4,554,312 discloses thermoplastic blends of a polycarbonate resin with a poly(alkylene terephthalate) resin, an acrylic core-shell impact modifier and an epoxide-containing polymer modifier. The preferred poly(alkylene terephthalate) resin is poly(ethylene terephthalate) (PET).

U.S. Pat. No. 4,267,096 discloses blends comprising 65–97.5 parts by weight of an aromatic polycarbonate resin, 1–30 parts by weight of an amorphous polyester resin and 0.1–6 parts by weight of a partially hydrogenated copolymer of a vinyl aromatic compound and a diolefin. The amorphous polyester resin may be a poly(alkylene terephthalate) or a poly(cyclohexylene dimethylene terephthalate) resin.

U.S. Pat. No. 3,864,428 discloses thermoplastic resins comprising 10–75 wt% polycarbonate, 25–85 wt% of an aromatic polyester and 2–35 wt% of a butadiene polymer-vinyl monomer graft copolymer. These resins do not contain PET, however.

EP 0 135 779 discloses polycarbonate blends containing a poly(alkylene terephthalate) resin and an amorphous copolyester copolymer resin which is prepared by reacting terephthalic and/or isophthalic acids with a mixture comprising cyclohexanedimethanol and ethylene glycol in a molar ratio of 4:1 to 1:4, respectively.

U.S. Pat. No. 4,628,074 teaches that polycarbonate compositions containing polycarbonates and a poly(cyclohexylene dimethylene terephthalate) resin with an effective amount of an impact modifier such as an olefin diene terpolymer exhibit improved impact strength. Similarly, U.S. Pat. No. 4,536,538 discloses compositions containing a major amount of an aromatic polycarbonate and a minor amount of an amorphous polyester derived from cyclohexane dimethanol and an aromatic dicarboxylic acid.

Despite considerable efforts, a need still exists for impact modified polyester/polycarbonate blends which exhibit improved impact strength at both high and low temperatures.

SUMMARY OF THE INVENTION

Accordingly, one object of the present invention is to provide a polyester/polycarbonate blend which exhibits improved impact strength at both high and low temperatures.

This and other objects of the present invention which will become apparent from the following specification have been achieved by the present polyester/polycarbonate blend which comprises:

1. 10–50 wt% of an aromatic polycarbonate,
2. 20–45 wt% of a poly(ethylene terephthalate) resin,
3. 20–50 wt% of a poly(cyclohexylene dimethylene terephthalate) resin, and
4. 8–20 wt% of an impact modifier, wherein the notched Izod impact strength of said blend is greater than 2.0 ft-lb/in. at $-40°$ C. and greater than 18.5 ft-lb/in. at $23°$ C. Furthermore, these high impact strengths are achieved while maintaining a good balance of other mechanical and physical properties.

DETAILED DESCRIPTION OF THE PREFERRED EMBODIMENTS

Applicants have discovered that poly(ethylene terephthalate)/poly(cyclohexylene dimethylene terephthalate)/polycarbonate (PET/PCT/PC) impact modified blends exhibit improved impact strength at both high and low temperatures. The improved impact strength is dependent on a critical combination of PET and PCT. The impact modified blends of the present invention are useful in the automotive and appliance industries as well as numerous other industrial applications.

Polycarbonate resins which are suitable for use in the present invention are well known in the art and are generally commercially available. These polycarbonates may be prepared by a variety of conventional and well known processes which include trans-esterification, melt polymerization, interfacial polymerization, etc. The polycarbonates are generally prepared by reacting a dihydric phenol with a carbonate precursor, such as for example phosgene. Suitable processes for preparing the polycarbonates of the present invention are described in, for example, U.S. Pat. Nos. 4,018,750, 4,123,436 and 3,153,008. However, other known processes for producing polycarbonates are suitable. Particularly preferred polycarbonates are aromatic polycarbonates, prepared by reacting bisphenol-A [2,2-bis(4-hydroxyphenyl) propane] with phosgene.

Similarly, the polycyclohexylene dimethylene terephthalate resins of the present invention are commercially available and are based on copolymerization reactions between 1,4-cyclohexane dimethanol and terephthalic acid or an ester forming derivative thereof. Ester forming derivatives include simple esters of acids such as methyl esters and ethyl esters and acid halides such as chloro and bromo acid halides.

The PCT resin of the present invention comprises glycol units which consist entirely of 1,4-cyclohexanedimethanol. Other glycols such as alkylene glycols, for example ethylene glycol, may not be used in the preparation of the PCT resins of the present invention. PCT resins including additional glycols (PCTG resins) such as those disclosed in EP 0 135 779 are therefore not included in the PCT resins of the present invention.

The PCT resin may be prepared by procedures well known in the art such as the condensation reactions disclosed in U.S. Pat. No. 4,536,538 or other suitable methods.

Poly(ethylene terephthalate) resins which may be used in the blends of the present invention are well known and are available commercially and methods for their preparation are described, for example, in U.S. Pat. No. 2,465,319 and U.S. Pat. No. 3,047,539.

In addition to the PET/PCT/PC components noted above, the impact modified blends of the present invention include an impact modifier. Impact modifiers which are suitable for use in the present invention may be selected from the broad classes of ethylene/propylene rubbers (EPR) and their modifications or acrylic core-shell polymers. The impact modifier should have a Tg below $-25°$ C. as measured by dynamic mechanical spectroscopy at a freqency of 0.3 Hz.

The ethylene/propylene rubbers may be copolymers of ethylene and propylene in ratios from about 0.5:1.5 to 1.5:0.5 with a preferred ratio of about 1:1. They may also contain a small amount of diene monomer such as ethylidene norbornene, dicyclopentadiene, and hexadiene (EPDM polymers). Either of these systems may be further grafted with other monomers such as an alkenoic nitrile, ester, amide, or acid, or a vinyl aromatic monomer such as styrene, or mixtures of an alkenoic monomer and vinyl aromatic monomer. The systems are described, for example, in U.S. Pat. Nos. 4,550,138; 4,485,212; and 4,493,921.

The acrylic core-shell impact modifiers have a rubbery core, which may be either an acrylic rubber or a butadiene or styrene-butadiene rubber. In each modifier, the Tg of the rubber phase must be below $-25°$ C. as measured by dynamic mechanical spectroscopy at a frequency of 0.3 Hz. The shell of these impact modifiers is a hard acrylic-based polymer, for example, poly(methylmethacrylate). The acrylic core-shell polymers and their use are described in U.S. Pat. Nos. 4,096,202; 3,864,428 and 4,200,567.

The blends of the present invention consist of PET/PCT/PC/impact modifier in the following percentages by weight:

Poly(ethylene terephthalate) resin: 20-45 wt%,
Poly(cyclohexylene dimethylene terephthalate) resin: 20-50 wt%,
Polycarbonate: 10-50 wt%, and
Impact modifier: 8-20 wt%.

The inherent viscosity range of each of the polyester resins (PCT and PET) is generally 0.4-1.0, preferably 0.6-0.8. Inherent viscosity is measured at 25° C. in a 60/40 by weight mixture of phenol/tetrachloroethane at a concentration of 0.5 g/100 mL.

The impact modified blends of the present invention exhibit improved notched notched Izod impact strength which is useful for numerous industrial applications. A resin is defined as having improved impact strength according to the present invention if the resin exhibits a notched Izod impact strength (ASTM D256) of greater than 2.0 ft-lb/in. at $-40°$ C. and also greater than 18.5 ft-lb/in. at 23° C. Notched Izod impact strength is measured according to ASTM D256 using ⅛ inch molded bars.

In general, an increase in temperature is usually accompanied by higher impact strength values for plastics. The impact strength is generally much lower as the temperature is decreased. Surprisingly, the impact modified blends of the present invention exhibit relatively high impact strength at both low temperature and high temperature. This unobvious increase in impact strength at both high and low temperatures is believed to result from the critical combination of PET and PCT resins in the present polymer blends. It has further been found that not all polycarbonate blends containing PET and PCT resins exhibit the required increase in impact strength at both high and low temperatures.

The blends of the present invention contain from 10 to 50 wt% of the aromatic polycarbonate resin. When the amount of polycarbonate resin exceeds 50% or is less than 10%, a decrease in the impact strength at 23° C. and/or $-40°$ C. occurs.

The present blends contain from 20-50 wt% of the PCT resin. When the amount of PCT resin is lower than 20 wt%, the polymer blend exhibits poor impact strength at lower temperatures ($-40°$ C.) as well as decreased impact strength at 23° C. When the amount of PCT resin is increased above 50 wt%, a similar decrease is observed. Accordingly, the blends of the present invention should contain from 20-50 wt% of the PCT resin.

The impact modified blends of the present invention may be subject to conventional processing methods such as injection molding, extrusion, etc. Specific industrial applications may require the addition of conventional additives such as stabilizers, pigments, flame retardants, fillers, reinforcing agents, and/or processing aids. Such additives may be added to the impact modified blends of the present invention in any amounts which do not significantly alter the impact strength of the blend.

Other features of the invention will become apparent in the course of the following descriptions of exemplary embodiments which illustrate the invention and are not intended to be limiting thereof.

EXAMPLES

In the Examples, PET 9902 has an I.V. of 0.795 and PCT 3879 has an I.V. of 0.77. Impact modifiers used in the following examples are:

| Modifier Name | Supplier | Type | Tg (°C.) |
| --- | --- | --- | --- |
| X-372 | Uniroyal | EPDM | −35.5 |
| Paraloid KM330 | Rohm & Haas | Acrylic Core-Shell | −30.0 |
| Metablen C-223 | M & T Chemical | Acrylic Core-Shell | −65.0 |
| Vistalon 99-90 | Exxon | EPR | −41.0 |

Examples A-F

Blends of PET 9902/PCT 3879/Merlon M40/Uniroyal X-372 EPDM type impact modifier were prepared as shown in Table I. The blends were dried (120° C., 16h), melt compounded on a 1.5-in. single screw MPM extruder at 280° C. and chopped into pellets. The samples were redried (120° C, 16h) and molded on a 175 ton New Britain injection molding machine (290° C. melt, 23° C. mold temperature). Notched Izod impact strengths were obtained according to ASTM D256.

The combination of the notched Izod impact strengths at 23° C. and $-40°$ C. of Blends C and E were seen to both be high, i.e. greater than 18.5 and 2.0 ft-lb/in. respectively. Blends C and E are in the scope of the present invention, while blends A, B, D, and F are outside the scope.

TABLE I

|   | A | B | C | D | E | F |
|---|---|---|---|---|---|---|
| % PET 9902 | 44.64 | 44.64 | 26.79 | 26.79 | 26.79 | 30.00 |
| % PCT 3879 | — | 17.86 | 35.71 | 17.86 | 26.79 | 30.00 |
| % Merlon M40 | 44.64 | 26.79 | 26.79 | 44.64 | 35.71 | 40.00 |
| % X-372 | 10.71 | 10.71 | 10.71 | 10.71 | 10.71 | — |
| 10-mil notched Izod (ft-lb/in.) | | | | | | |
| at 23° C. | 17.2 | 21.8 | 20.2 | 16.7 | 18.9 | 1.7 |
| at −40° C. | 1.7 | 1.7 | 2.3 | 2.5 | 2.3 | 1.3 |

Examples G–O

Blends of PET 9902/PCT 3879/Merlon M40/Paraloid KM330, an acrylic impact modifier from Rohm and Haas, were prepared as shown in Table II. The molding procedure was the same as cited in Example 1. Upon review of the data, an unusual phenomenon was seen. The combination of the notched Izod impact strengths at 23° C. and −40° C. of Blends I and K are seen to both be high. Again, Examples I and K are within the scope of the present invention, whereas Examples G–H, J, and L–O are not.

TABLE II

|   | G | H | I | J | K |
|---|---|---|---|---|---|
| % PET 9902 | 44.64 | 44.64 | 26.79 | 26.79 | 26.79 |
| % PCT 3879 | — | 17.86 | 35.71 | 17.86 | 26.79 |
| % Merlon M40 | 44.64 | 26.79 | 26.79 | 44.64 | 35.71 |
| % KM330 | 10.71 | 10.71 | 10.71 | 10.71 | 10.71 |
| 10-mil notched Izod (ft-lb/in.) | | | | | |
| at 23° C. | 17.2 | 18.3 | 23.0 | 17.5 | 21.0 |
| at −40° C. | 2.1 | 1.7 | 2.4 | 2.7 | 2.6 |

|   | L | M | N | O |
|---|---|---|---|---|
| % PET 9902 | 30.00 | 35.71 | 40.00 | — |
| % PCT 3879 | 30.00 | 17.86 | 20.00 | 44.64 |
| % Merlon M40 | 40.00 | 35.71 | 40.00 | 44.64 |
| % KM330 | — | 10.71 | — | 10.71 |
| 10-mil Notched Izod (ft-lb/in.) | | | | |
| at 23° C. | 1.8 | 18.1 | 1.6 | 16.6 |
| at −40.° C. | 1.6 | 2.4 | 1.4 | 11.1 |

Examples P–S

Blends of PET 9902/PCT 3870/Merlon M40/Metablen C-223 MBS (methacrylate/butadiene/styrene) impact modifier, a product of M&T Chemical, were prepared as shown in Table III. The molding procedure was the same as cited in Example 1. Upon review of the data, an unusual phenomenon was seen. The combination of notched Izod impact strengths at 23° C. and −40° C. of Examples R and S (the only two compositions within the scope of the invention) are seen to be high.

TABLE III

|   | P | Q | R | S |
|---|---|---|---|---|
| % PET 9902 | 44.64 | 44.64 | 26.79 | 26.79 |
| % PCT 3879 | — | 17.86 | 35.71 | 26.79 |
| % Merlon M40 | 44.64 | 26.79 | 26.79 | 35.71 |
| % Metablen C-223 | 10.71 | 10.71 | 10.71 | 10.71 |
| 10-mil notched Izod (ft-lb/in.) | | | | |
| at 23° C. | 15.1 | 19.6 | 20.5 | 19.2 |
| at −40° C. | 4.0 | 1.8 | 7.5 | 11.4 |

Examples T–W

Blends of PET 9902/PCT 3879/Merlon M40/Vistalon 99-90 EPR impact modifier (a maleic anhydride grafted ethylene-propylene rubber supplied by Exxon) were prepared as shown in Table IV. The molding procedure was the same as cited in Example 1. The combination of the notched Izod at 23° C. and −40° C. of Examples V and W (within the scope of the invention) are seen to be high.

TABLE IV

|   | T | U | V | W |
|---|---|---|---|---|
| % PET 9902 | 44.64 | 44.64 | 26.79 | 26.79 |
| % PCT 3879 | — | 17.86 | 35.71 | 26.79 |
| % Merlon M40 | 44.64 | 26.79 | 26.79 | 35.71 |
| % 99-90 | 10.71 | 10.71 | 10.71 | 10.71 |
| 10-mil notched Izod (ft-lb/in.) | | | | |
| at 23° C. | 14.7 | 14.2 | 22.7 | 20.3 |
| at −40° C. | 2.1 | 2.1 | 3.7 | 3.4 |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. An impact modified polyester-polycarbonate blend, comprising:
   (a) 20–45 wt% of a poly(ethylene terephthalate) resin,
   (b) 20–50 wt% of polyester resin, the dicarboxylic acid component of which consists essentially of terephthalic acid and the glycol component of which consists of 1,4-cyclohexane-dimethanol,
   (c) 10–50 wt% of a polycarbonate, and
   (d) 8–20 wt% of an impact modifier selected from the group consisting of ethylene-propylene rubbers and acrylic core-shell polymers, wherein the notched Izod impact strength of said blend is greater than 2.0 ft-lb/in. at −40° C. and greater than 18.5 ft-lb/in. at 23° C. as measured by ASTM D256 using ⅛ inch molded bars.

2. The blend of claim 1, wherein said impact modifier has a Tg below −25° C. as measured by dynamic mechanical spectroscopy at a frequency at 0.3 Hz.

3. The blend of claim 1, wherein said ethylene/propylene rubber has an ethylene/propylene ratio of about 1:1.

4. The blend of claim 1, wherein said ethylene/propylene rubber further comprises repeat unit from a diene monomer.

5. The blend of claim 4, wherein said diene monomer is selected from the group consisting of ethylidene norbornene, dicyclopentadiene and hexadiene.

6. The blend of claim 1, wherein said poly(cyclohexylene dimethylene terephthalate) resin and said poly(ethylene terephthalate) resin have an inherent viscosity of 0.4–1.0.

7. The blend of claim 6, wherein said inherent viscosity is 0.6–0.8.

8. The blend of claim 1, wherein said polycarbonate is a bisphenol—A—polycarbonate.

* * * * *